United States Patent [19]
Helphrey

[11] 4,396,288
[45] Aug. 2, 1983

[54] CONTROL OF MULTI-POSITION FILTER MECHANISM IN AN OPTICAL MEASURING SYSTEM

[75] Inventor: David B. Helphrey, Santa Ana, Calif.

[73] Assignee: Beckman Instruments, Inc., Fullerton, Calif.

[21] Appl. No.: 353,466

[22] Filed: Mar. 1, 1982

Related U.S. Application Data

[63] Continuation of Ser. No. 165,531, Jul. 3, 1980, abandoned.

[51] Int. Cl.³ ............................. G01J 3/12; G01J 3/50
[52] U.S. Cl. .................................... 356/326; 356/332; 356/418; 356/419
[58] Field of Search ............... 356/319, 326, 331, 332, 356/333, 334, 418, 419

[56] References Cited

U.S. PATENT DOCUMENTS 3,144,498  8/1964  Alpert et al. ...................... 356/334

*Primary Examiner*—Vincent P. McGraw
*Attorney, Agent, or Firm*—R. J. Steinmeyer; Robert R. Meads; John R. Shewmaker

[57] ABSTRACT

A method of identifying an operating position of a multiple-position filter changing mechanism situated in an optical path of a spectrophotometer by detecting and measuring a spectral characteristic(s) of light passed along the optical path to the spectrophotometer detector for one or more operating positions of the filter mechanism and comparing the measured spectral characteristic(s) with stored spectral characteristic information for one or more operating positions of the filter mechanism.

4 Claims, 7 Drawing Figures

CONTROL OF MULTI-POSITION FILTER MECHANISM IN AN OPTICAL MEASURING SYSTEM

This is a continuation of application Ser. No. 165,531, filed July 3, 1980, now abandoned.

BACKGROUND OF THE INVENTION

1. Field of the Invention

The present invention relates to the use of light filters in optical measuring systems and, more particularly, the operation and control of multiple position filter changing mechanisms in such systems.

2. Background of the Invention

Many optical measuring systems including but not limited to photometers, spectrophotometers, fluorometers, and the like, are adapted to perform optical measurements with various optical filters positioned in the optical measuring path. Depending upon the nature of the sample to be analyzed, the type of instrument to be employed, and the operating conditions to be satisfied, different filters or combination of filters are required to be positioned in the optical path. In order to simplify the filter positioning operation, various multiple position filter changing mechanisms have been developed which are controllable to automatically select the required filters. One common and mechanically simple form of filter changing mechanism is a filter wheel or disc supporting a plurality of filters or filter combinations at spaced circumferential positions around the disc. The disc is rotated or otherwise advanced to position various ones of the filters in the optical path sequentially.

The control of such filter changing mechanisms has been effected in several basic ways. In one approach the filter mechanism is connected to and driven by mechanical linkages which slave the filter mechanism to the mechanical state of other system components. In another approach, a separate position sensing device monitors the position of the filter mechanism and sends filter mechanism position information via a closed loop feedback control network to a filter mechanism controller. While the above approaches function satisfactorily to control filter mechanism positioning, they require additional control elements and logic and generally are less versatile and more costly than desired.

SUMMARY OF THE INVENTION

The present invention resides in a novel method of controlling a multiple position filter changing mechanism which overcomes the drawbacks of the prior approaches. The method is simple in operation and straightforward in implementation and is particularly adapted for use in optical measuring systems of the type including a detector in an optical path to measure filtered light received from a sample situated in the path for measurement.

The method of the invention in its broadest aspect contemplates measuring a spectral characteristic of the filter mechanism in one or more operating positions to determine an operating position of the filter mechanism. To these ends the invention includes the steps of (a) storing spectral characteristic information of one or more of the operating positions of the filter changing mechanism, (b) setting the filter changing mechanism in an operating position, (c) directing light of predetermined spectral characteristics along the optical path, (d) detecting and measuring a spectral characteristic of light reaching the detector, and (e) comparing the spectral characteristic measured in step (d) with the stored spectral characteristic information in an effort to identify an operating position of the filter changing mechanism. After identifying one operating position the filter changing mechanism can be advanced to a predetermined operating position or through a known sequence of operating positions for executing sample or other measuring operations of the spectrophotometer.

In a preferred form of the invention, the method comprises the further step of repeating the steps (b)–(e) for one or more other operating positions of the filter changing mechanism. In this manner a spectral characteristic may be measured for each of successive operating positions of the filter changing mechanism, even if each measurement alone is not determinative of an operating position, to establish a sequence of measured characteristics which establishes an operating position of the mechanism.

By virtue of the invention, the operating position of the filter changing mechanism can be identified using optical elements already existing in the instrument and is accomplished without the need for feedback position sensors or other complex position sensing and control elements of the prior art. Comparison of the known and measured spectral characteristics further serves to identify operational failures of the filter changer mechanism such as failure to change from one position to another or to stop in a given position as well as loss of a filter from the filter mechanism or degradation of its spectral characteristics with time.

DESCRIPTION OF THE PREFERRED EMBODIMENT

Figure 1:
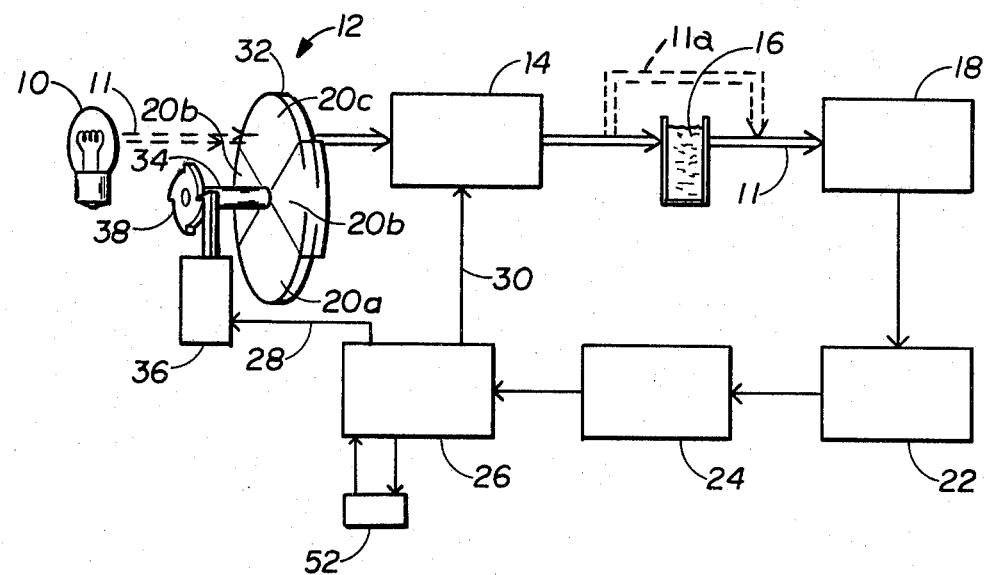
FIG. 1 is a block diagram of a spectrophotometer implementing the method of the present invention and illustrates in perspective a filter changing mechanism intercepting an optical path of the spectrophotometer.

As shown in the drawings for purposes of illustration, the present invention is embodied for use in an optical measuring system, such as the spectrophotometer system illustrated in FIG. 1. The basic spectrophotometer system components are of a form conventional in the art and will be described only to the extent necessary to set forth use of the invention in the spectrophotometer. To this end, the spectrophotometer includes a light source 10, light energy from which is directed along an optical path or axis 11 serially through a filter changing mechanism 12, a monochromator 14, a sample 16 and thence to a detector 18. Source 10 is preferably a white light tungsten incandescent lamp. Filter changing mechanism 12 supports a plurality of filters 20a, 20b, 20c and 20d which are adapted to be positioned individually in the path of light issuing from source 10. Filter 20b is illustrated as a stacked filter combination of two individual filters. Each positioned filter 20, when operatively positioned in optical path 11, attenuates selected wavelengths of the light from the source and passes the attenuated light beam to monochromator 14. The monochromator, in turn, is controllable in a conventional manner to further restrict or limit the wavelength of light and passes only a selected narrow bandwidth of light to sample 16 and thence to detector 18. The detector provides a measure of the transmittance or absorbance of the sample by detecting the amount of light energy passed by the sample at the selected wavelengths.

FIG. 1 illustrates, in effect, a single-beam spectrophotometer in which sample material 16 and a reference material are inserted individually into the optical path 11 at different times for measurement. In a well known double-beam configuration, however, as is preferred with the present method, the sample is disposed in one path and a reference is disposed in a second reference path 11a illustrated in dashed outline. Light issuing from monochromator 14 is chopped in a conventional manner to be directed alternately along the sample beam path and the reference beam path and the thus formed reference and sample light beams are combined before reaching the detector. A demodulator (not shown) is associated with the detector for demodulating the combined sample-reference signal to derive a measurement of sample vs. reference.

The signal generated by detector 18 is amplified by amplifier 22, converted to digital form by a-d converter 24, and supplied to a data acquisition and control system 26. System 26 can be either a hardwired controller or programmable microcomputer well known in the art. Control signals are supplied by the control system over respective control lines 28 and 30 to control the operation of filter changer mechanism 12 and monochromater 14, respectively.

Filter changer mechanism 12 is illustrated as a conventional filter wheel or disc 32 mounted on a rotatable shaft 34 with the disc segmented into the plurality of filter sections, herein 20a, 20b, and 20c, and 20d. Shaft 34 is rotated by a conventional solenoid 36 and ratchet 38, in response to the control signal received from control system 26 over line 28, to position selected ones of the filters 20 in the optical path 11 between light source 10 and detector 18.

Figure 2:
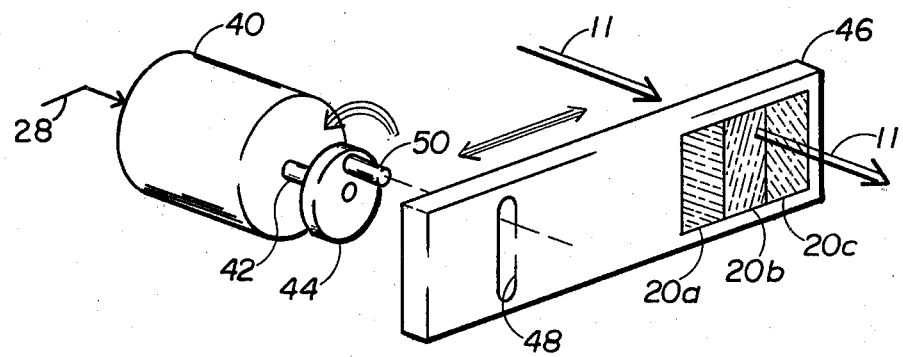
FIG. 2 illustrates another filter changing mechanism suitable for use in the spectrophotometer of FIG. 1.

FIG. 2 illustrates an alternative and preferred form of filter changing mechanism comprising a pulse driven rotary solenoid 40 having a rotatable output shaft 42 on which a disc 44 is axially supported for rotation together with a linearly actuable slider 46 supporting three filters 20a, 20b, and 20c. Slider 46 includes a vertical slot 48 adapted to receive an axial pin 50 extending from rotatable disc 44. With pin 50 in slot 48, energization of solenoid 40 rotates disc 44 and pin 50 causing slider 46 to be driven linearly back and forth in a manner which positions each of the optical filters supported thereby in the optical path 11 in succession. Thus, beginning arbitrarily with filter 20a, the filters would be positioned in the sequence of 20a, 20b, 20c, 20b, 20a, 20b, 20c, etc. Since movement of slider 46 is linearly back and forth, middle filter 20b is positioned more frequently in the sequence than the remaining two.

In accordance with a primary aspect of the present invention spectral characteristics of the filter changing mechanism 12 in one or more operating positions are measured to identify an operating position of the filter changing mechanism and to control positioning of the filter changing mechanism thereafter. For this purpose, control system 26 communicates with a segment of storage 52 in which known spectral characteristic information of the filter changing mechanism 12 and the filters 20 therein is stored. The spectral characteristics stored in storage segment 52 relate to the optical transmission characteristics of the filters, i.e. the amount of light energy passed by the filters, as measured by detector 18, in an appropriate band or bands of the light wavelength spectrum. Storage segment 52 may take any convenient form of read-write memory. If the invention is practiced on a manual instrument, without a control system 26, the spectral information can be stored as positions or conditions of an impedance network or as potentiometer settings.

With the spectral characteristics of filter changing mechanism 12 held in storage 52, and with the initial operating position of the filter changing mechanism unknown, the present invention contemplates measuring the spectral characteristics of light passing through one or more of filters 20a-20c by means of spectrophotometer detector 18, and comparing the measured spectral characteristic with the stored spectral characteristic information to identify an operating position of the filter changing mechanism. In the double-beam arrangement, only light directed along reference beam path 11a is measured (i.e. the sample beam is effectively blocked) for each positioned filter. This avoids interference by sample containers inadvertently or inaccurately positioned in the sample beam path. Thereafter, with one operating position of the filter changing mechanism identified, and with the filter position orientation of the mechanism pre-established, the filter mechanism is advanced to any designated initial operating position by supplying the requisite number of control pulses over control line 28 to drive the solenoid and hence the filter changing mechanism to the desired initial operating position. Thereafter, with the filter mechanism appropriately positioned, a sample measuring operation is conducted in the usual manner.

The amount of light measured by detector 18 at a given operating position of the filter changing mechanism 12 at given wavelength setting of the monochromator 14 can identify the positioned filter with respect to the remaining filters if the detector output signal level has a value unique to such filter (e.g. is above or below a given threshold or is between predetermined upper and lower threshold limits). In such case measurement of light passed in a single operating position of the filter changing mechanism serves, when compared with the stored spectral characteristic information, to identify the operating position of the filter changing mechanism 12.

If the measured spectral characteristic for one filter operating position is ambiguous or is similar to characteristics of other filter positions, it is still possible to measure further spectral characteristics of such one filter operating position which identify the one filter from among the others. In this respect a filter in a single operating position can be identified by controlling monochromator 14 to pass energy at selected wavelength settings in sequence, detecting the light energy passed at each wavelength setting, and measuring the ratios of detected light at the different wavelength settings. Such ratios calculated for appropriate wavelength combinations form a profile characteristic of one and only one filter in the set of filters and, accordingly, when compared with the stored spectral characteristic information in storage segment 52, identify the positioned filter.

Figure 3:
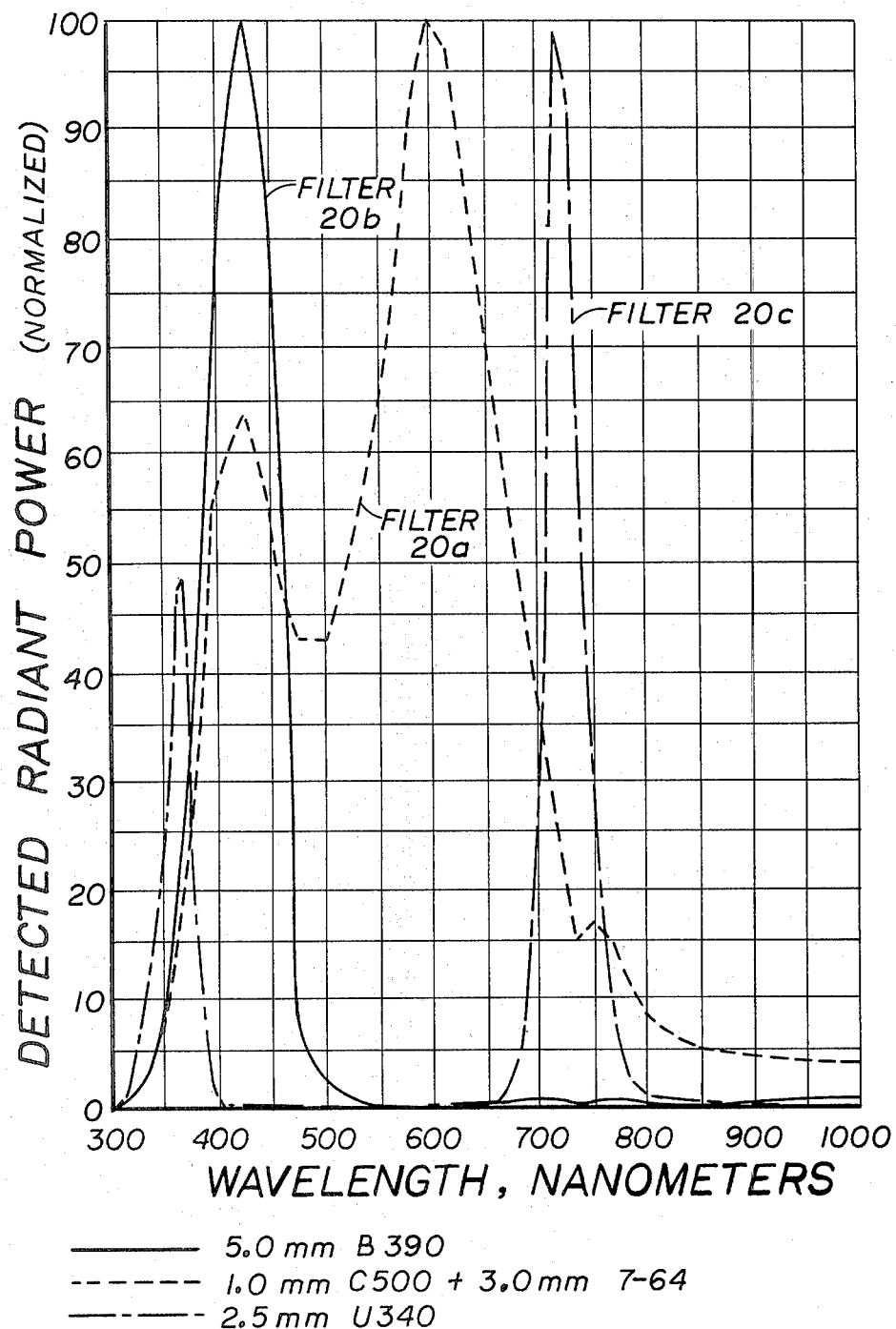
FIG. 3 is a graphical representation of normalized detected radiant energy vs. wavelength of selected optical filters incorporated in the filter changing mechanism of FIG. 2.
Figure 4:
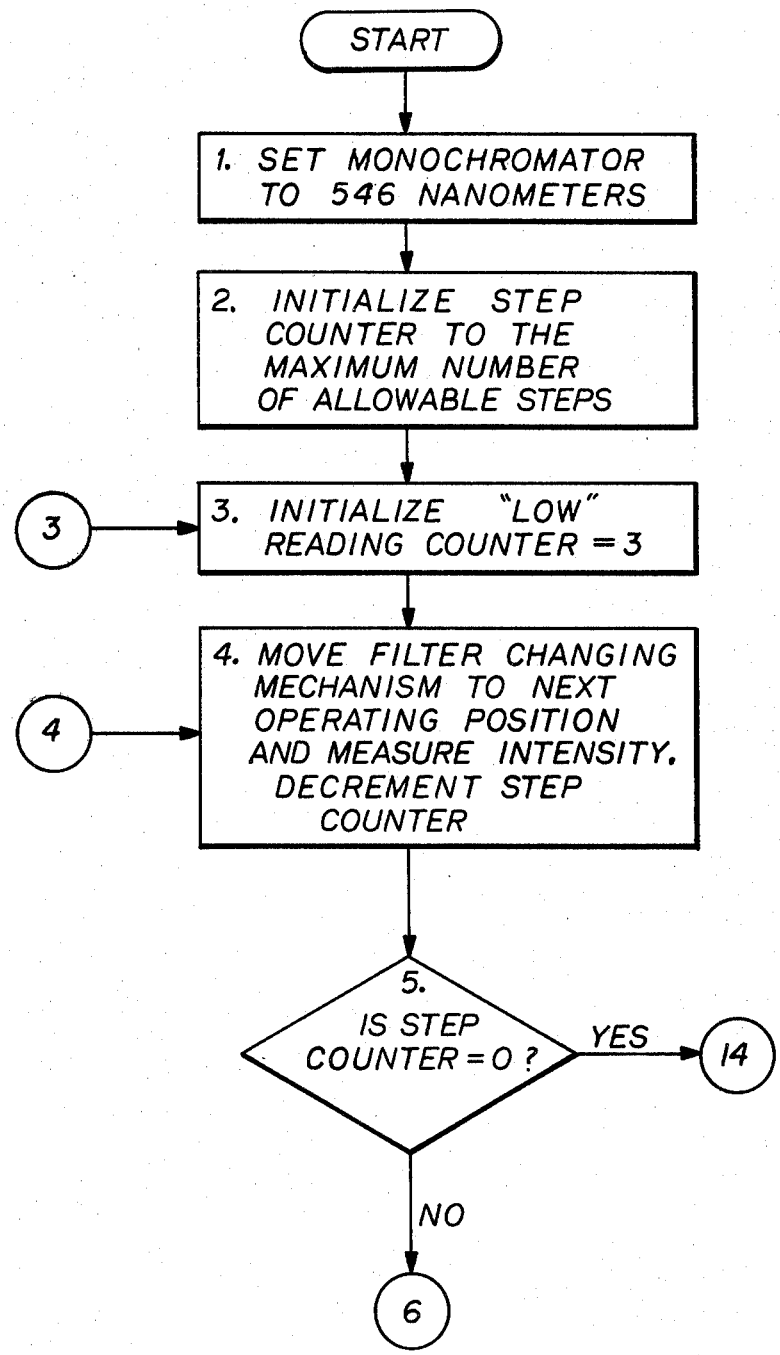
FIGS. 4a–4d set forth a combined algorithm in flow chart format for carrying out identification of a filter changing mechanism operating position in accordance with the present invention.
Figure 4B:
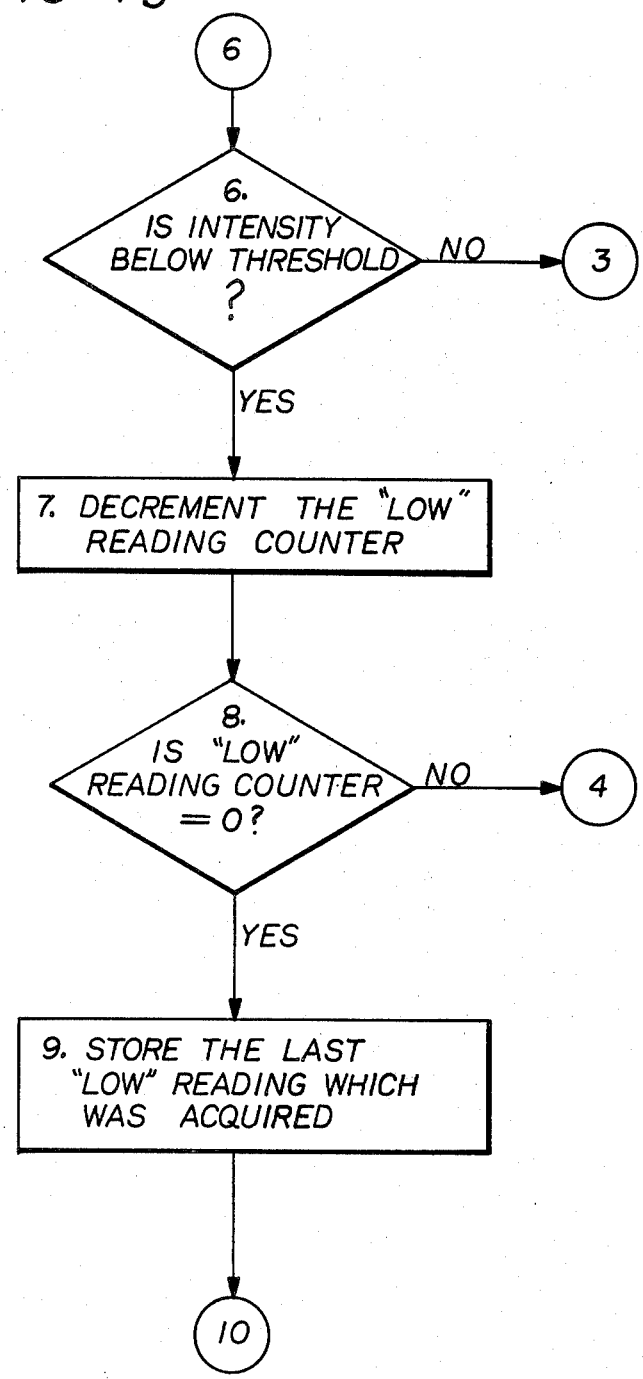
Figure 4C:
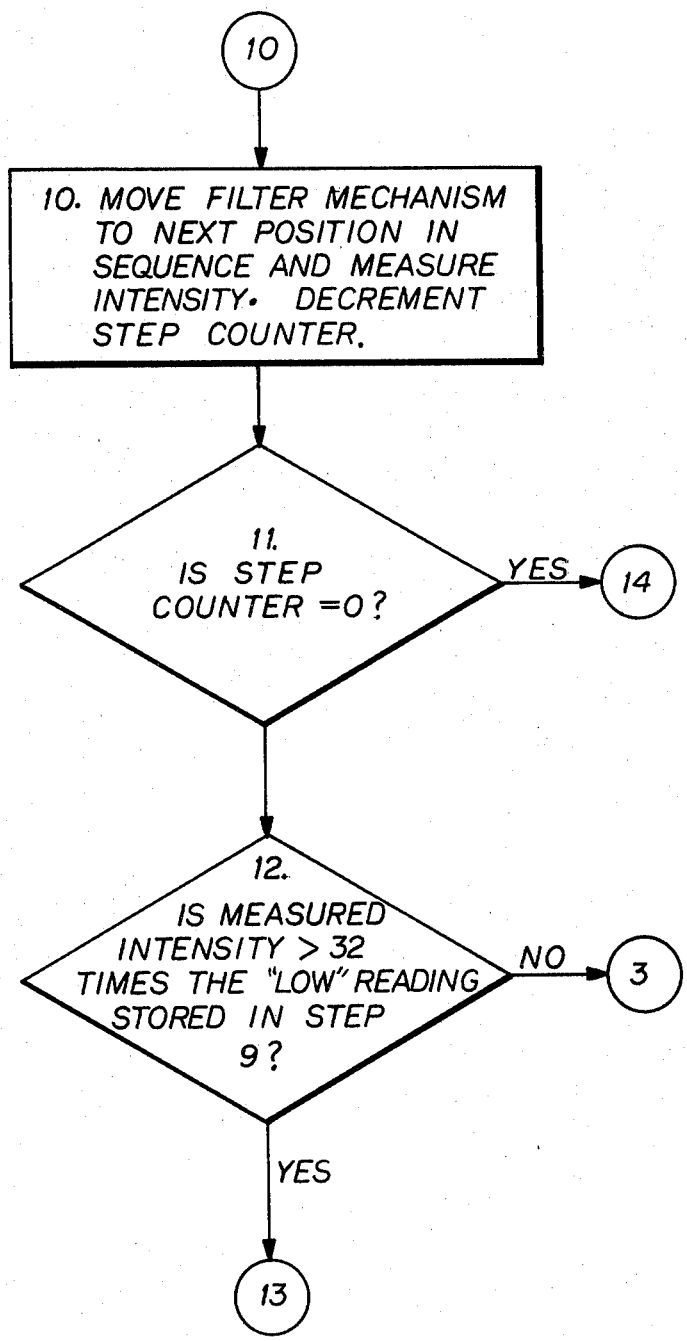
Figure 4D:
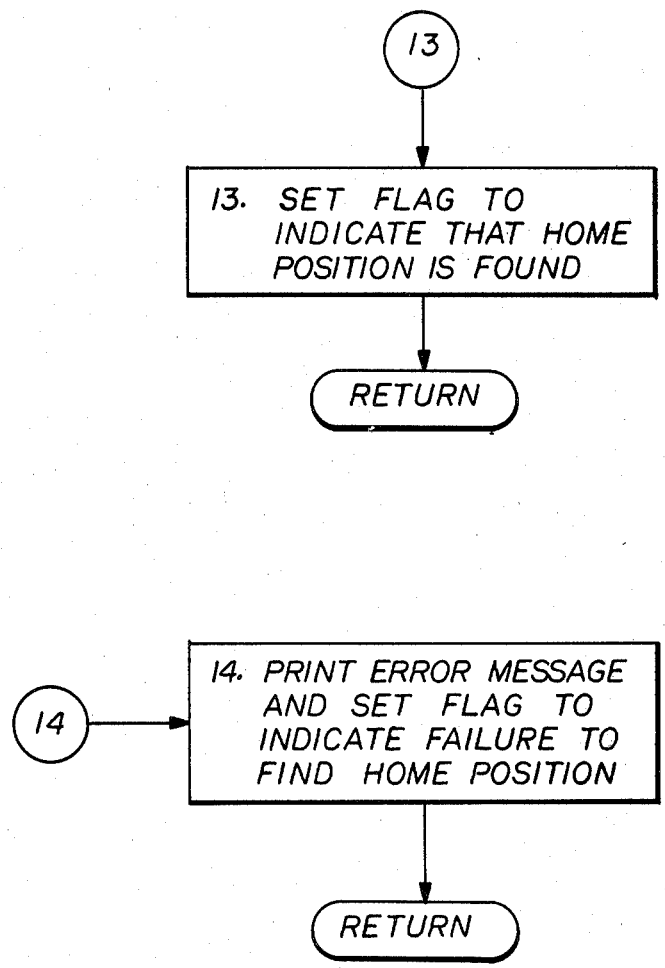

To develop the nature of the spectral characteristics stored in storage 52 for the preferred filter changer embodiment of FIG. 2, FIG. 3 illustrates superimposed graphical plots of the normalized detected radiant power as a function of wavelength (nanometers) passed by the respective FIG. 2 filters 20a, 20b and 20c when positioned in the path of light from source 10. Filter 20a has a radiant energy pass band from about 400 to about 675 nanometers. Filter 20b has a pass band between about 360 and 460 nanometers. Filter 20c has a radiant energy pass band at about 350 nanometers and between about 690 and 740 nanometers. It will be observed from these waveforms that at about 546 nanometers, for example, neither filter 20b nor 20c will pass light but filter 20a will. Thus, for the preferred embodiment, the initial operating position of the filter mechanism 12 is determined by directing light from source 10 through one or more of the filters 20a–20c while restricting the light energy reaching detector 18 to energy which only one filter will pass (i.e. energy at 546 nanometers). This restriction is achieved by tuning monochromator 14 to pass light only in the narrow band at 546 nanometers.

If the filters are positioned sequentially in the light beam and the energy passed by each is detected and measured by detector 18, beginning at an unknown operating position, eventually the filter operating position for filter 20a will be reached which will be the first and only filter position to pass a significant amount of light at 546 nm to generate a "high" signal which, when compared with stored spectral characteristic information in storage 52, indicates that the filter changing mechanism is in the operating position for filter 20a. However, such a "high" signal might also be indicative of an improperly positioned or missing filter or may indicate some other malfunction or failure of the filter mechanism. Accordingly, in the preferred embodiment, an operating position of the filter mechanism is determined with more certainty by measuring the spectral characteristics for sequential operating positions of the filter mechanism until a predetermined sequence of filter positionings is attained. For the filter changing mechanism of FIGS. 2-3 a sequence is ultimately executed in which virtually no energy is passed at three consecutive operating positions (corresponding to positioning of filters 20b, 20c and 20b in sequence) followed by passage of a substantial amount of light at 546 nanometers in the fourth position for filter 20a. Thus, a succession of three "low" readings followed by a "high" reading of detected light energy indicates that the filter changing mechanism 12 is then in the operating position which positions filter 20a in the optical path.

In the preferred embodiment the detected light energy passed for each position of filter mechanism 12, as detected by detector 18, is amplified at 22 and converted to digital form at 24 and supplied to control system 26. The control system, in turn, operates in a conventional fashion to store the readings at each operating position and to compare each reading and/or the resulting sequence of readings with the stored spectral characteristics of the filter mechanism stored in storage segment 52.

FIGS. 4a–4d illustrate the algorithm or method steps performed in implementing the present method with control system 26 in the form of a conventional microprocessor with storage segment 52. It is understood that the particular hardware arrangement of such a digital processor is well known in the art and forms no part of the present invention. In general, however, such general purpose computers include a central processing unit, a programmed sequence of memory instructions (a read only memory), an uncommitted block of useable memory (a read/write memory), and various input and output interfacing capabilities. Instructions can be executed from the read-only memory. Data can be transferred into or out of the read/write memory and into or out of the central processing unit. The central processing unit is configured to fetch and/or execute data and/or instructions to and/or from the memories and to the various input and output control devices. Programming such a computer for automated method implementation and operation and coordinating information processing is straightforward and well established in the art and the algorithm set forth in FIG. 4 is programmed in such a conventional manner.

The FIGS. 4a–4d algorithm steps are numbered 1 through 14. In step 1 system 26 issues an appropriate signal over line 30 to set monochromator 14 to pass light in the narrow band at 546 nanometers.

In step 2 a counter (not shown) is initialized for counting the number of filter measurements made. The initial value is set to be a maximum number of measurements (e.g. 10) to be allowed before it is assumed that the algorithm has failed to identify an operating position.

In step 3 a "low" reading counter is initialized for counting the number of light intensity measurements by detector 18 below a predetermined threshold value. Each measurement below this threshold is considered to be a "low" measurement.

In step 4 a control signal is issued over line 28 to position the filter changing mechanism in the next of its operating positions at which the intensity of 546 nanometer light passing through the filter is then measured. Simultaneously the step 2 counter is decremented one count.

In step 5 if the step 2 counter has been decremented to zero, then the maximum allowable number of filter measurements (e.g. 10) has been made without identifying an operating position, and the operator is directed to step 14 which generates an error or failure flag.

If the step 2 counter has not been decremented to zero, then, in step 6, a determination is made whether the the measured spectral characteristic light intensity (of light directed along reference beam path 11a) is greater than a predetermined value (e.g. 64 ADC counts). If it is then such measurement is considered a "high" reading, and the operator is directed bak to step 3 to again initialize the "low" reading counter.

If the measured intensity in step 6 is "low", then the "low" reading counter is decremented one count in step 7.

In step 8 a determination is made whether the "low" reading counter has been decremented to zero. If not, then there have not yet been three successive "low" readings, and the operator is directed back to step 4 to move the filter mechanism to the next operating position.

In step 9 if three successive "low" readings have been found, then the program stores the intensity of the third "low" reading so that it may be compared with the following reading.

In step 10 the filter mechanism is moved to the next operating position and the intensity of light at 546 nanometers passing through the filter is again measured. The step counter is decremented one count.

In step 11 if the step 2 counter has been decremented to zero, then the maximum allowable number of filter measurements (e.g. 10) has been made without identifying an operating position, and the operator is directed to step 14 which generates an error or failure flag.

If it is determined in step 11 that the step 2 counter is not zero, then the question is posed in step 12 whether the measured light intensity is greater than the last "low" reading, i.e. the last "low" reading was the third of three successive "low" readings stored in step 9. If the measured intensity is not greater by a predetermined amount (i.e. by an amount which defines a "high" reading, e.g. 32 times), then the low-low-low-high sequence has not been established and the operator is directed to step 3 to again initialize the "low" reading counter.

If step 12 determines that the measured intensity is greater than the last "low" reading by the predetermined amount, i.e. if it is a "high" reading, then the four position sequence has been established and the operating position of the filter changing mechanism has been established. Such is flagged in step 13 and the operator is returned to the main program.

The foregoing algorithm is straightforward to implement and a conventional microcomputer is readily and easily programmed by a programmer of ordinary skill in the art to execute the steps of the algorithm.

The method of the invention is implemented by storing spectral characteristics for one or some or all of the operating positions of the filter changing mechanism. The operating position is determined by performing measurements in one or more operating positions. The measured characteristics are compared with the stored spectral characteristic information for one or more or all of the operating positions, as desired. If compared to stored information for one operating position, then measurements are made in sequential operating positions until the one operating position is located. If information is stored for more than one operating position, then measurements may be made in sequential operating positions, even if and after a single measurement identifies an operating position, to verify an operating position by deriving an established sequence of measurements. Moreover, a measurement may be made each time the filter mechanism operating position is changed to identify and verify the new position of the mechanism. By identifying filter mechanism position the present invention further serves to identify any failures or malfunctions of the filter changing mechanism such as failure to properly change from one position to another, failure to stop at one or more operating positions as well as a loss of a filter from the filter changing mechanism, or degradation of a filter's spectral characteristics with passage of time.

It should further be understood that in some applications the filter changing mechanism 12 may include one or more filter mechanism operating positions in which little or no light is attenuated and even may be configured with a totally blocking filter or comparable blocking shield or a totally transmissive filter or comparable aperture with no filter at all and that the present invention as described and claimed includes the use and positioning of filter changing mechanisms as thus configured.

Moreover, while a preferred embodiment of the invention has been illustrated and described, modifications may be made therein without departing from the scope of the invention as defined in the appended claims.

What is claimed is:

1. For use with an optical measuring system of the type comprising means for directing light along an optical path toward a light detector, the detector adapted to provide a measure of light passed by a sample in the optical path, a plurality of filters, a filter changing mechanism adapted to advance in sequence through a plurality of operating positions to place predetermined ones or combinations or none of the filters in the optical path to attenuate, for each operating position, predetermined selected wavelengths of light passing along the optical path, an improved method of identifying an operating position of the filter changing mechanism comprising the steps of:
    (a) storing spectral characteristic information of one or more of the operating positions of the filter changing mechanism;
    (b) setting the filter changing mechanism in an operating position;
    (c) directing light of predetermined spectral characteristics along the optical path;
    (d) detecting and measuring the spectral characteristic of light reaching the detector; and
    (e) comparing the spectral characteristic measured in step (d) with the stored spectral characteristic information in an effort to identify an operating position of the filter changing mechanism.

2. The method of claim 1 including the further steps of
    (f) placing the filter changing mechanism in one or more further operating position(s); and
    (g) repeating steps (b) through (e) for each further operating position.

3. The method of claim 2 wherein steps (f) and (g) are repeated to derive a predetermined sequence of known spectral characteristics identifying a sequence of operating positions of the filter changing mechanism.

4. The method of claim 1 further including the steps of
    (f) repeating step (c) one or more times with the filter changing mechanism the same one operating position by directing light of different predetermined spectral characteristics along the optical path for each repetition thereof; and
    (g) correlating the measurements of detected light for the different spectral characteristic light to derive a unique characteristic profile identifying the one operating position of the mechanism.

* * * * *